CANTILEVER SEMICONDUCTOR MOUNTING

Filed Sept. 10, 1958

INVENTORS:
RUDOLPH R. KILIAN,
WILLIAM P. BARNETT,
BY Julius J. Zaskalicky
THEIR ATTORNEY.

2,963,632

CANTILEVER SEMICONDUCTOR MOUNTING

Rudolph R. Kilian and William P. Barnett, Syracuse, N.Y., assignors to General Electric Company, a corporation of New York Filed Sept. 10, 1958, Ser. No. 760,134

5 Claims. (Cl. 317—235)

The present invention relates generally to semiconductor devices and, more particularly, to mounting structures for the active semiconductive members of such devices.

The semiconductive members or bodies used in transistors, diodes and other such semiconductive devices are frequently of rather small size. For example, in one particular device the body comprises a bar .005 of an inch by .008 of an inch by .090 of an inch. Bars of these dimensions are easily fractured, especially if tensile forces and forces in shear are exerted on the body. Various methods of mounting such bars have been used in the past. One such method was to support the bar between a pair of resilient conductors. In the use of such devices, vibrational and other stresses are frequently set up in the resilient conductors causing one conductive support to move with respect to the other, thereby fracturing the semi-conductor body, or the connections thereto.

The present invention is directed to the provision of an improved mounting structure in which such occurences are eliminated. Accordingly, a particular object of the present invention is to provide a mounting structure for semiconductor bodies which is able to withstand very great vibrational stresses.

Another object of the present invention is to provide improvements in mounting structures for bar-shaped semiconductive bodies.

Another object of the present invention is to provide a mounting structure which need not be held to close tolerances, yet which is suitable to accommodate semiconductive bodies of widely variant dimensions.

A further object of the present invention is to provide a semiconductive device which is easily fabricated.

The present invention is carried out in one illustrative form thereof in a semiconductor device using a bar-shaped body of semiconductor material by the provision of a rigid connection to one end of the bar and by the provision of flexible connections to the other portions of the semiconductor body.

The features of this invention which are believed to be novel are set forth with particularity in the appended claims. The invention itself, however, both as to its organization and method of operation, together with further objects and advantages thereof, may best be understood by reference to the following description taken in accordance with the accompanying drawings, in which:

Figure 1:
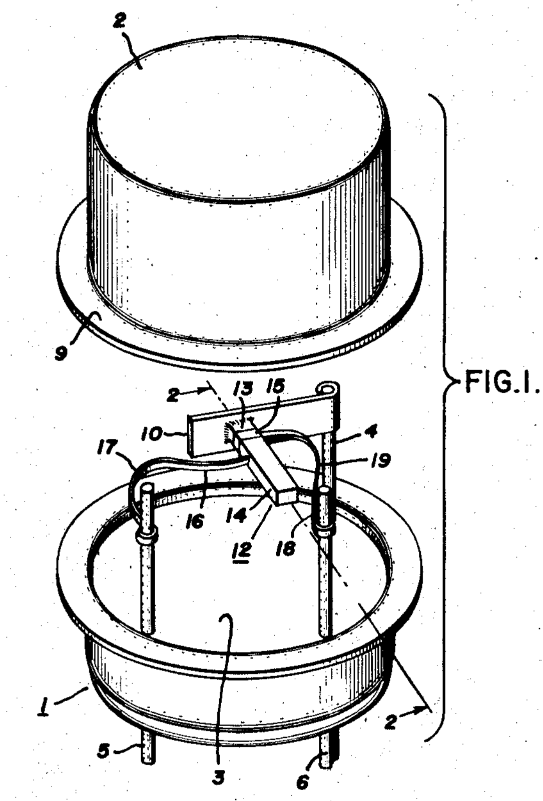
Fig. 1 is a perspective view of a semiconductor device partly disassembled showing the mounting structure of the present invention in perspective.

Referring now to Figure 1, there is shown a device comprising a header member 1 and a cap member 2. The header member 1 comprises an insulating base portion 3 in which are embedded conductive leads 4, 5 and 6 and which is surrounded by a cylindrical conductive member 7 having a flanged portion 8 adapted to engage with flange portion 9 of cap 2. A conductive strip 10 of resilient material, for example nickel, which has been plated or clad with tin, is fastened at one end to lead 4 by soldering or spot welding. The other end of strip 10 has a detent or notch 11 to accommodate one end of a bar of semiconductor material 12.

In Figure 1 the bar is shown as a transistor bar, the end portions 13 and 14 thereof, collector and emitter, are of N-type conductivity and the intermediate portion 15 thereof, the base, is of P-type conductivity. The intermediate portion 15 is shown enlarged for purposes of illustration, it being well understood that this region in most transistor devices is quite thin. Of course, it will be understood that bars of PNP geometry as well as other geometries may be used. One end of the bar is fastened to the spring member 10 by inserting end 13 of the bar into the notch 11 and then applying heat to cause the tin on strip 10 to fuse the bar thereto. Tin is used because it is a neutral material with respect to inducing conductivity in the semiconductor bar and therefore forms an ohmic contact with the bar. Strip 10 is oriented substantially perpendicularly to the lead 6 which is oriented perpendicular to the plane of insulating support member 3. The bar is oriented in a direction such that its greatest dimension is parallel to the plane of the header.

The other end of the semiconductor bar is connected to lead 5 by means of flexible wire conductor 16 which may be a nickel wire which has been tin plated. Wire 16 is provided with a loop 17 or a certain amount of slack and is soldered at one end thereof to the other end of the bar and may be crimped or soldered to the leads 15. Similarly, the connection to the base of the transistor bar is made by means of flexible wire 18 having a loop 19 or slack therein. As the base region is of P-type conductivity, good ohmic contact is assured by using aluminum wire. One end of wire 18 is precisely positioned on the base region and fused or otherwise suitably fastened thereto. As the base region may be of the order of a fraction of a thousandth of an inch wide, wire 18 is of the same order of size. The other end of this wire 18 is either crimped, soldered or welded to the lead 6. After the header portion of the device has been completely fabricated, flange 9 of the cap 2 is welded or soldered to flange 8 of header 1 to effect a secure and hermetic seal of the cap to the header member.

Figure 2:
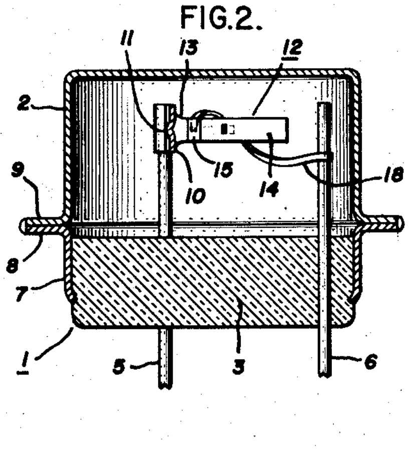
Figure 2 is a side view of the semiconductor device of Figure 1 in section and assembled.

In Figure 2 is shown a sectional view taken along section 2—2 of Figure 1 showing the make-up of the header member and the various regions of the semiconductor bar and the connections thereto.

Figure 3:
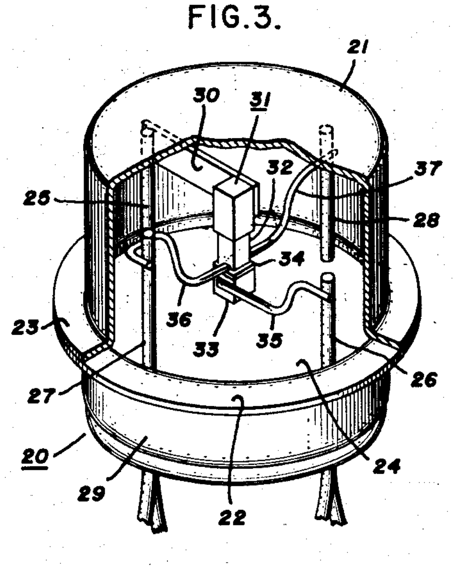
Figure 3 is a perspective view of another embodiment of the present invention showing the application thereof to a transistor tetrode type of device.

Referring now to Figure 3, there is shown another illustrative embodiment of the present invention in perspective. The device shown comprises a header member 20 and a cap member 21 assembled thereto by welding or soldering the mating flange portions 22 and 23 thereof. The header member comprises an insulating base portion 24 of glass or other suitable insulating material in which are embedded conductive leads 25, 26, 27 and 28. Surrounding the insulating material is a conductive cylindrical member 29 including the flange portion 22 which engages flange portion 23 of the cap 21.

A conductive strip 30 of resilient material, for example nickel, which has been tin plated, is soldered or spot welded to the lead 25 in a way to extend perpendicularly therefrom. From the other end of the conductive strip 30 a bar of semiconductor material 31 is suspended with one end soldered to the strip 30 by fusion of the tin solder thereon. The bar 31 comprises a section of monocrystalline material having end portions 32 and 33 of one type conductivity, for example N-type, and an intermediate portion 34 of P-type conductivity. It will, of course, be understood that other geometries and other types of bodies may as well be used. Conductive connection is made between the other N-type region 33 of the bar to the lead 26 by means of a nickel wire 35 which has been coated with tin and provided with a loop or a certain amount of slack therein. In the device shown, the thin intermediate region of P-type conductivity is exposed by etching and connections are made to this region by means of conductors 36 and 37, each having loops therein to permit freedom of movement of bar 31 on strip 10 and each comprised of gold-gallium wire. One side of the base region is connected to lead 27 by conductor 36 and the other side of the base region is connected to lead 28 by conductor 37. The various wires 35, 36 and 37 are connected to the various regions of the bar by fusing wires at the point of contact. Connection of wires 35, 36 and 37 to the leads 26, 27 and 28 is made by welding or soldering the wires thereto. Wires 35, 36 and 37 also have loops in them of sufficient extent that vibrational and shock stresses set up in the device enable the bar 31 to vibrate and be deflected over a considerable amplitude without straining the bar itself and the connections thereto.

While specific embodiments have been shown and described, it will, of course, be understood that various modifications may be devised by those skilled in the art which will embody the principles of the invention and found in the true spirit and scope thereof.

What we claim as new and desire to secure by Letters Patent of the United States is:

1. A semiconductive device comprising an insulating supporting member having a plurality of conductive leads extending therethrough, a spring member connected to one of said leads and extending substantially perpendicularly therefrom, a bar of semiconductive material having well-defined end portions and an intermediate portion, means for rigidly mounting one of said end portions to said spring member and for flexibly connecting each of said other portions to a respective lead.

2. A semiconductor device comprising an insulating base having a plurality of conductive leads extending therethrough, a spring member connected to one of said leads and extending substantially perpendicularly therefrom, a bar of semiconductive material having well-defined end portions and an intermediate portion forming emitter, collector and base, respectively, of a transistor, means for rigidly securing one of said end portions to said spring member, a plurality of flexible wires, each having a loop therein and each connecting a respective one of said other portions to a corresponding lead.

3. A semiconductor device comprising an insulating generally planar base having a plurality of conductive leads extending therethrough, a spring member connected to one of said leads and extending normally therefrom, a bar of semiconductive material having well-defined end portions and an intermediate portion forming emitter, collector and base, respectively, of a transistor, means for rigidly securing one of said end portions to said spring member, said bar being generally oriented with respect to the largest dimension thereof substantially perpendicular to the plane of said base, a plurality of flexible wires, each having a loop therein and each connecting a respective one of said portions to a corresponding lead.

4. A semiconductor device comprising an insulating generally planar base having a plurality of conductive leads extending therethrough, a spring member connected to one of said leads and extending normally therefrom, a bar of semiconductive material having well-defined end portions and an intermediate portion forming emitter, collector and base, respectively, of a transistor, means for rigidly securing one of said end portions to said spring member, said bar being generally oriented with the longest dimension thereof substantially parallel to the plane of said base, a plurality of flexible wires, each having a loop therein and each connecting a respective one of said portions to a corresponding lead.

5. A semiconductor device comprising an insulating generally planar base having a plurality of conductive leads extending therethrough and located at the corners of a rectangle, a bar of semiconductive material having well-defined end portions and an intermediate portion forming emitter, collector and base of a transistor, a spring member having one end secured to one of said leads and extending substantially perpendicular thereto, one end portion of said bar being rigidly secured to the other end of said spring member and extending perpendicularly downward therefrom toward said insulating supporting member, a pair of flexible wires, each having a loop therein and connected between a different region of said base portion and a respective lead, and another flexible wire having a loop therein connected between said other end portion and another lead.

References Cited in the file of this patent

UNITED STATES PATENTS

| | | |
|---|---|---|
| 2,817,048 | Thuermel et al. | Dec. 17, 1957 |
| 2,860,291 | Karnavas | Nov. 11, 1958 |
| 2,882,462 | Zierdt | Apr. 14, 1959 |
| 2,914,716 | Larrison | Nov. 24, 1959 |
| 2,928,030 | Lighty | Mar. 8, 1960 |